INVENTORS.
JOHN J. ELCHISAK
WILLIAM D. HOPE
BY
Stanley Z. Cole
ATTORNEY

XEROGRAPHIC PLATE FABRICATION

INVENTORS.
JOHN J. ELCHISAK
WILLIAM D. HOPE
BY
Stanley Z. Cole
ATTORNEY

INVENTORS.
JOHN J. ELCHISAK
WILLIAM D. HOPE
BY
Stanley Z. Cole
ATTORNEY

XEROGRAPHIC PLATE FABRICATION

Filed Sept. 26, 1963 10 Sheets-Sheet 4

INVENTORS.
JOHN J. ELCHISAK
WILLIAM D. HOPE
BY
Stanley Z Cole
ATTORNEY

INVENTORS.
JOHN J. ELCHISAK
WILLIAM D. HOPE
BY Stanley Z. Cole
ATTORNEY

Sept. 12, 1967 J. J. ELCHISAK ET AL 3,341,681

XEROGRAPHIC PLATE FABRICATION

Filed Sept. 26, 1963 10 Sheets-Sheet 6

INVENTORS.
JOHN J. ELCHISAK
WILLIAM D. HOPE
BY
Stanley Z. Cole
ATTORNEY

XEROGRAPHIC PLATE FABRICATION

Filed Sept. 26, 1963 10 Sheets-Sheet 7

INVENTORS.
JOHN J. ELCHISAK
WILLIAM D. HOPE
BY Stanley Z. Cole
ATTORNEY

INVENTORS.
JOHN J. ELCHISAK
WILLIAM D. HOPE
BY Stanley Z. Cole
ATTORNEY

INVENTORS.
JOHN J. ELCHISAK
WILLIAM D. HOPE
BY Stanley Z. Cole
ATTORNEY

FIG. 19
TIME-SECONDS
INITIAL WARM-UP
LEADING EDGE WELD
WRAP-UP
TRAILING EDGE WELD
0 5 10 15 20 25 30 35 40 45 50 55 60 65 70 75 80 85 90
S-1
S-2
PL-1
PL-2
PL-3
PB-1
PB-2
MS-1
2
3
4
5
6
7
8
9 DOUBLE POLE
MS-10 INTERMITTENT
MS-11 DOUBLE POLE
REL-1
REL-2
REL-3
SOL-1
SOL-2
SOL-3
SOL-4 2 COILS 1 2
SOL-5 2 COILS 1 2
M-68
M-102
M-92
29

INVENTORS.
JOHN J. ELCHISAK
WILLIAM D. HOPE
BY Stanley Z. Cole
ATTORNEY

United States Patent Office
3,341,681
Patented Sept. 12, 1967

3,341,681
XEROGRAPHIC PLATE FABRICATION

John J. Elchisak and William D. Hope, Rochester, N.Y., assignors to Xerox Corporation, Rochester, N.Y., a corporation of New York Filed Sept. 26, 1963, Ser. No. 311,872
8 Claims. (Cl. 219—78)

ABSTRACT OF THE DISCLOSURE

An apparatus for fabricating xerographic drums wherein a sheet-like member is bonded longitudinally on the surface of a drum blank supported at its axis by a rotatable mandrel. After the leading edge of the sheet-like member is secured to the drum surface, the mandrel is driven so as to rotate the drum blank a predetermined amount. The rotation of the drum blank effects the wrapping of its surface with the sheet-like member. The wrapped relation between the drum blank surface and the sheet-like member is intimate through the tensioning influence of a vacuum plate which restrains movement of the sheet-like member from its support platform to the surface of the drum as the drum is rotated. In addition, to maintain this taut, wrap-around relationship between the drum blank and the sheet-like member, a pressure clamp unit is operable to move into contact with the sheet-like member as this member breaks the vacuum of the vacuum plate and urges the latter portion of the sheet-like member into contact with the surface of the drum blank to permit a final bonding of this latter portion of the sheet-like member to the surface of the drum blank. These operations are all coordinated with appropriate solenoid control systems to provide a fully automatic apparatus.

This invention relates to process and apparatus for the fabricating of xerographic plates and the product thereof.

In the process of xerography, for example, as disclosed in Carlson Patent 2,297,691 issued Oct. 6, 1942, a xerographic plate comprising a layer of photoconductive insulating material on a conductive backing is given a uniform electric charge over its surface and is then exposed to the subject matter to be reproduced usually by conventional projection techniques. This exposure discharges the plate areas in accordance with the radiation intensity that reaches them, and thereby creates an electrostatic latent image on or in the photoconductive layer. Development of the latent image is effected with electrostatically charged, finely-divided material such as an electroscopic powder that is brought into surface contact with the photoconduction layer and is held thereon electrostatically in a pattern corresponding to the electrostatic latent image. Thereafter, the developed xerographic powder image is usually transferred to a support surface to which it may be fixed by any suitable means.

The xerographic plate exhibiting inherent photoconductive characteristics therefore forms one of the more if not the most essential element in carrying out the overall xerographic process. Photographic sensitivity, fidelity and the like ultimately produced are largely a function of the quality and characteristic properties of the particular plate. As commercially produced for carrying out the process continuously and automatically, the xerographic plate usually consists of a cylindrical drum or shell about 5 to 20 inches in diameter supporting on its periphery a photoconductive layer of a photoconductor such as vitreous selenium. As taught by Bixby in U.S. 2,970,906, procedures for applying vitreous selenium to a suitable substrate include conditions and apparatus of high vacuum.

While the method of Bixby produces the end product of desired quality, mass production, when applying vitreous selenium to drums, has been handicapped by the physical limitations imposed by the vacuum equipment. Thus, for a given equipment volume available for operability the number of drums that can simultaneously be coated in the vacuum chamber is largely a function of the individual drum bulk. Accordingly, for a given equipment size the mass production output of photoconductive coated drums has heretofore been limited by the number of units that can practically be placed within the vacuum equipment per cycle of operation. With a large capital investment in this type of production facility, a more efficient use thereof can result in a substantial saving per drum unit.

Now in accordance with the instant invention, there is provided a novel form of xerographic plate, produced by novel process and apparatus. The photoconductor, which may be selenium or any other photoconductor known in the art, is first formed on a conductive foil-like flexible substrate that is subsequently attached as by means of a percussive welding process tautly to a flat plate or to a drum blank with uniform firm adherence thereto. It has been found in accordance with the invention that the capacity of the vacuum equipment in terms of plate area on which vitreous selenium can be simultaneously deposited per cycle of operation as compared to previous methods is increased approximately 3 to 4 times as to substantially enhance the production output and decrease unit costs.

It is therefore an object of the invention to provide a novel method of forming a xerographic plate.

It is the further object of the invention to provide a novel xerographic plate useful in the xerographic art.

It is a further object of the invention to provide novel apparatus for attaching a photoconductive layer on a flexible substrate tautly about a drum blank to form a xerographic drum useful in an automatic xerographic apparatus.

It is a still further object of the invention to produce xerographic plates, particularly xerographic drums, more economically than heretofore.

The various features, advantages, and limitations of the invention will become apparent from the following description and drawings, in which:

FIG. 1(*a*) is an isometric view of a xerographic drum formed on a drum blank with the sheet of FIG. 1;

FIG. 2(*a*) is a fragmentary section of the relative physical relations in the step of attaching a leading edge of a sheet to a drum blank in accordance with the invention;

FIG. 2(*b*) is a similar relation as in FIG. 2(*a*) for attaching a trailing edge;

FIG. 2(*c*) illustrates the general physical configuration of FIG. 2(*b*) after welding;

Figure 1:
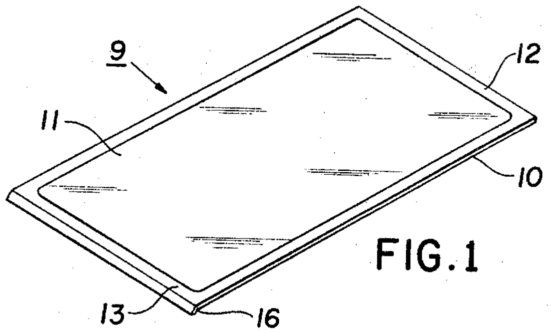
FIG. 1 is an isometric view of a photoconductive bearing flexible sheet of a type to be utilized in accordance with the invention.
Figure 1A:
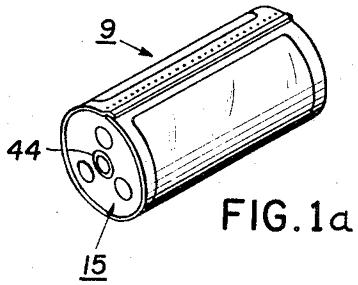

Referring now to FIG. 1, there is illustrated a sheet designated 9 comprising a photoconductive layer 11 previously applied, as in the Bixby patent cited, on a foil member 10 dimensioned substantially to conform to a rigid support on which it is to be applied as a drum blank 15 shown in FIG. 1(*a*). The foil may comprise any known material, such as brass or aluminum that is xerographically compatible with the photoconductor it is to support, while at the same time be of a material that is readily attachable to the ultimate support as by welding. Otherwise the foil should have a minimum thickness to provide strength for support and handling and a maximum thickness imposed as a function of the radius of wrap. Brass foil of 4–5 mils can be conveniently wrapped on a 2 to 3 inch radius. For purposes of the apparatus embodiment of welder to be described, foil 10 will be considered to be a commercial form of 4 mil brass to be attached to a steel drum. This however, is not intended to impose a limitation on the invention as other materials are substitutable as will be discussed below and as is known in the art.

The foil may be pretreated or cleaned as is known in the art, as for example disclosed in Stockdale copending application Ser. No. 118,626 filed June 21, 1961, now Patent No. 3,234,020, and then subjected to masked deposition of the photoconductor 11 on the surface. According to the invention it is preferred that well-defined exposed borders of foil at least at the trailing and leading edges thereof be provided and designated 12 and 13 respectively through which a weld can later be made. In the preferred arrangement the trailing border includes a lateral fold 16 of about 30° from the horizontal that after welding will produce a developer-tight spring-held overlapping joint in the manner shown in FIGS. 2(*b*) and 2(*c*). The foil may be precut or trimmed to size prior to masking or may be post cut following simultaneous deposition of photoconductive material in spaced apart areas on an extended foil length.

The photoconductor 11 may comprise any of the various photoconductive insulating materials known to be useful in the art of xerography. Such materials preferably including vitreous layers such as selenium, sulfur, or anthracene and other organic photoconductors as well as dispersions of photoconductive pigments such as zinc oxide in various resins or other electrically insulating binder material. Layer 11 is generally characterized as being a good electrical insulator capable of maintaining a surface charge in the dark, but becoming substantially more conductive when illuminated by visible light, X-rays, or other forms of activating radiation. In the preferred embodiment, layer 11 is considered to be a layer of vitreous selenium on the order of about 20 to 100 microns in thickness and may be applied to the foil as by vacuum evaporation techniques. It should be appreciated at this point that vitreous selenium in its applied state is generally soft and easily abraded requiring delicate handling during subsequent plate manufacturing steps to avoid scratching or other damage that would reduce or destroy its usefulness. Also, because selenium has a somewhat taffy-like brittleness the radius of curvature about which it is to be wrapped is directly related to its thickness. For example, 50 micron selenium is limited to about a one-inch radius while 20 micron can be wrapped to ¼ inch. The other photoconductors are less brittle and therefore impose less of a problem in this regard.

Figure 2A:
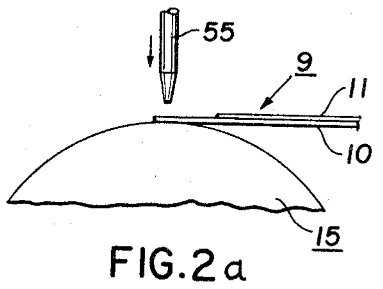
FIG. 2 is an exterior isometric view of a welding apparatus adapted for attaching the sheet of FIG. 1 to the drum blank.
Figure 2B:
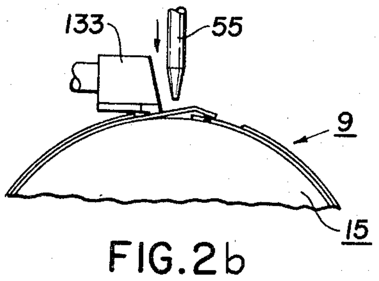
Figure 2C:
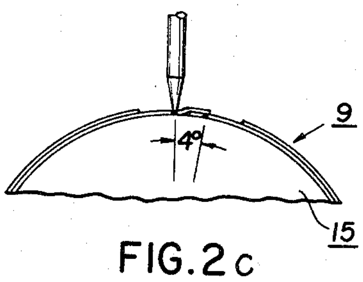
Figure 2:
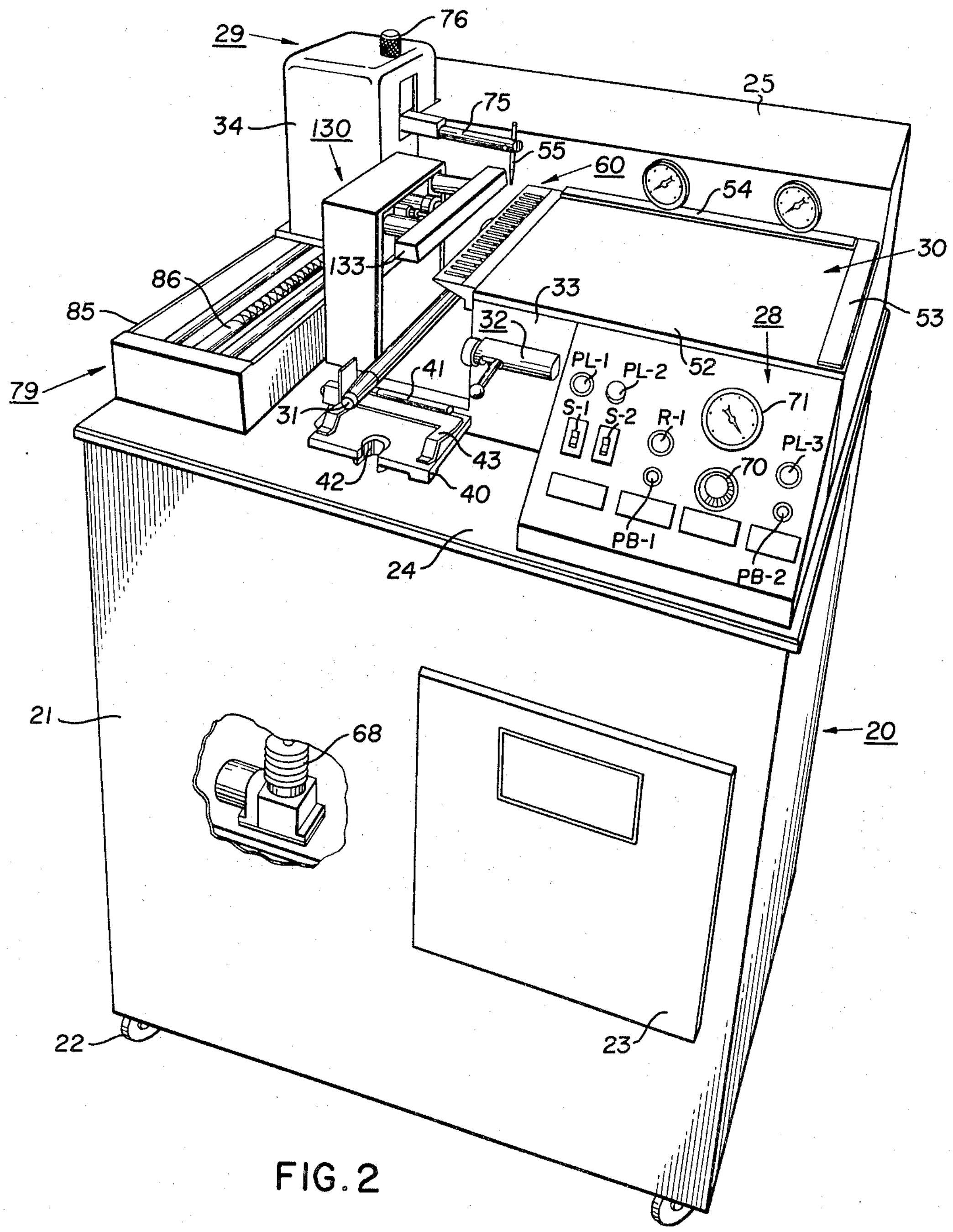

Referring now particularly to FIG. 2 there is illustrated an exterior view of an apparatus designated 20 adapted to effect a neat spot weld attachment of the plate 9 to a drum blank 15. The apparatus includes cabinet sections 21 and 25 that enclose many of the working components and the former of which is mounted on casters 22 that permit portability in moving the apparatus about to a desirable location of operations.

Mounted on the front wall of cabinet 21 is a panel 23 supporting a power supply internally of the apparatus. On top of the cabinet is a shelf 24 supporting various operational units including generally a control panel 28, a welding unit 29, a plate support 30 and a rotatable mandrel 31 on which to support a drum blank 15 to which a plate on support 30 is to be attached.

To initiate use of the apparatus, a bolt latch 32 secured on a side wall 33 of the plate support is first withdrawn into unlatching position permitting a hinged gate 40 to be pivoted downward on its hinge 41 to the position shown in FIG. 2. As can be seen (see also FIG. 3) the gate includes a journal support 42 which with the gate when closed supports the mandrel 31 for rotation. Also provided on the inside face of the gate member is a ground electrode 43 connected to a ground cable 50 and which makes electrical contact with a side wall of a drum blank during the welding operation as will be described.

With the gate down, a suitable drum blank 15 is slipped via an axial drum sleeve 44 onto mandrel 31 until engaging a driving pin (not shown) on the mandrel. The gate is then closed and bolt 45 of latch 32 is drawn laterally via lever 46 until the flat face 47 of a cam 48 secured to the bolt end engages a striker plate 49 secured on the front face of the gate. Thereafter, lever 46 is pivoted downwardly causing cam 48 to force gate 40 to a tightly closed position relative to the drum blank.

A plate foil 9 on which a photoconductive layer 11 has been applied is then placed on platform 52 of support 30. About the platform are arranged rear and side guide members 53 and 54 respectively adapted to receive the right trailing corner of the foil member whereby to physically align the leading edge thereof into relation with the drum as shown in FIG. 2(*a*). As can be seen, in this position the foil is supported in an approximately horizontal plate extending perpendicular to the drum axis with the leading edge of the foil overextending the line of peripheral drum tangency by approximately $\frac{1}{16}$ inch. At the same time margin 12 is positioned below the lateral path to be described of the welding electrode 55.

With the drum blank and foil positioned with respect to each other as above, power is applied to the unit from the power supply by tripping toggle switches S1 and S2 on control panel 28. This energizes the welding unit 29 for warm up and places other components under control of individual switches as shown on FIG. 18.

In order to secure the underside of the foil tightly against the drum blank for the welding operation to follow, there is provided on the apparatus a vacuum lip designated 60 shown in FIGS. 2, 6, 7 and 8. The lip is mounted on the forward end of plate support 30 and when supplied with vacuum is adapted to draw the foil tightly downward thereagainst. Forming the lip is a laterally arranged casting 61 supporting a thin sectioned plate 62. Extending along the top surface of the casting there is defined a plurality of uniformly spaced transversely arranged grooves 63. Each of the grooves terminates rearward with an associated communicating passage 64 in turn connected to a common laterally arranged passage 65. At a central point connected to the passage 65 is an inlet 66 to which is attached a hose conduit 67 connected through a control valve 70 at its opposite end to the vacuum pump 68.

Operation of the vacuum pump is initiated by depressing push-button PB1, on the control panel 28, after which control valve 70 can be adjusted to effect the desired vacuum setting as indicated by gauge 71. Vacuum on the order of about 10 to 15 inches of mercury has been found suitable.

With the foil thus held, the leading border is then spot welded to the drum by means of the welding apparatus 29, that includes a welding head 34 of a type commercially available which in the preferred embodiment comprises a No. 1037 Weldmatic Welding Head, manufactured by the Weldmatic Division of Unitek Corporation. The welding head includes an arm 75 extending horizontally forword therefrom to support a welding electrode 55 positioned above the foil vertically aligned above the line of tangency between the foil and drum. The head includes a pneumatic actuator to effect a vertical reciprocating movement of arm 75 and electrode 55 and is timed to produce a spot-weld between the foil and drum on each occasion the electrode contacts the foil on its descent as the head is longitudinally advanced start-stop by means of a carriage 79. Adjustment knob 76 permits setting of the desired contact pressure of the electrode tip against the foil before firing the electrode. This setting is usually in the range of about 4–6 p.s.i.g.

Figure 4:
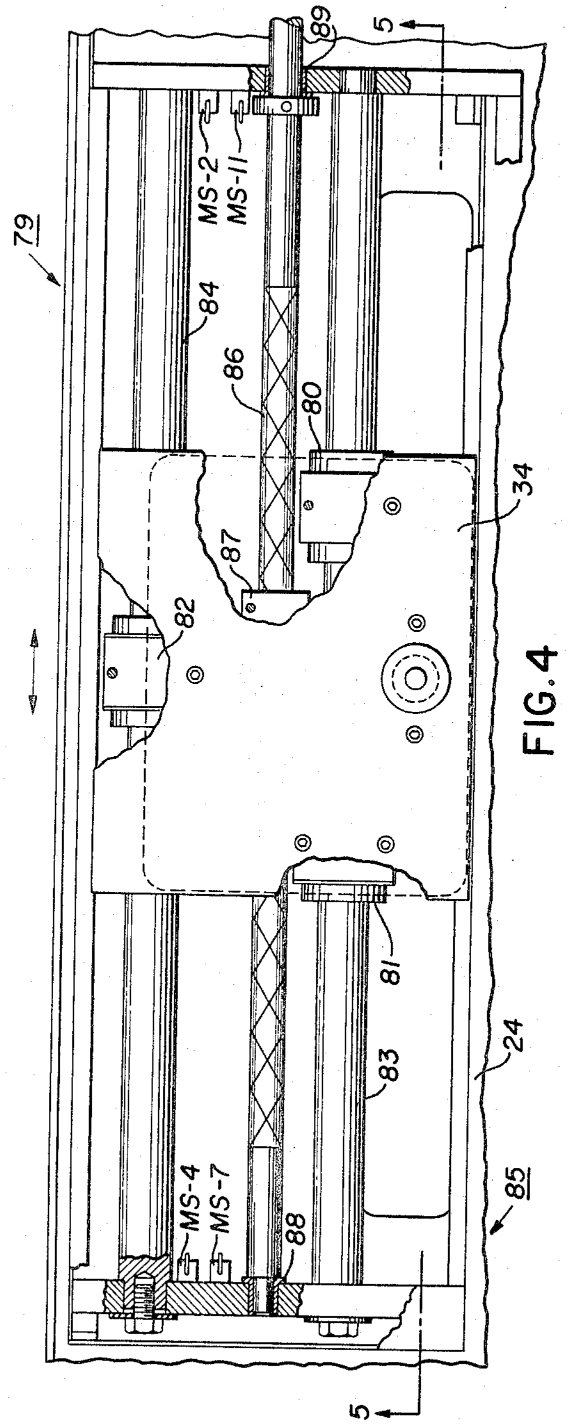
FIG. 4 is a plan view of the welding head carriage in the apparatus of FIG. 2.
Figure 5:
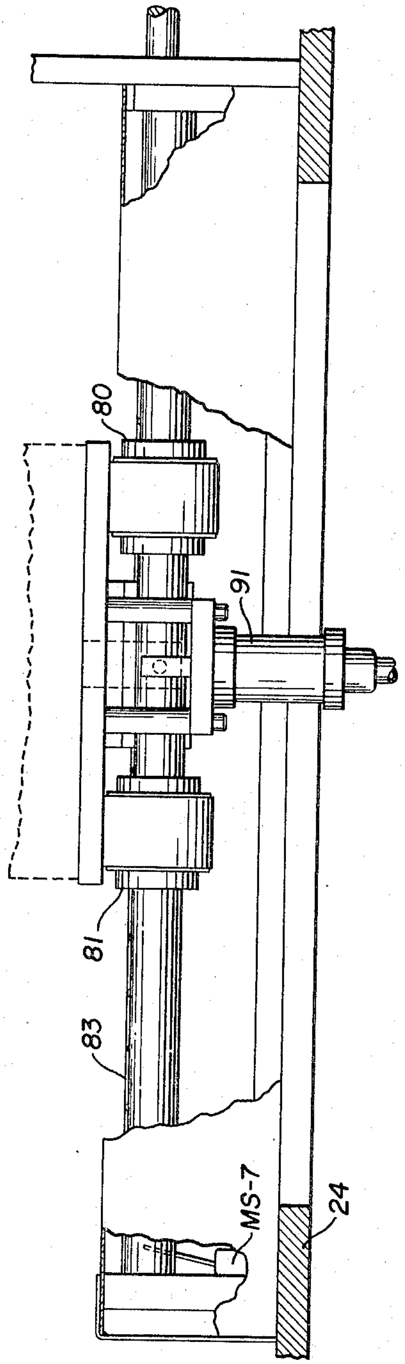
FIG. 5 is a sectional view taken substantially along lines 5—5 of FIG. 4.

Referring particularly to FIGS 2, 4, and 5, it can be seen that the welding head 34 is supported on the carriage by means of three frictional-type bearings, 80, 81, and 82, secured on its underside. The carriage includes parallel stationary guide rods 83 and 84 on which the bearings are adapted to ride and secured in opposite end walls of a rectangular frame 85 mounted on shelf 24. Extending parallel and between the guide rods is a rotatable reversing lead screw 86 mounted for rotation in frame bearings 88 and 89. The lead screw internally engages a lead nut 87 secured underside of the head causing the head to be advanced in the appropriate direction when screw 86 is rotated. Also suspended below the head is an air cylinder 91 adapted when pulsed to draw the electrode from a normally up position as shown in FIG. 2 to a descended contact position for welding as shown in FIG. 2(*c*).

Drive for the lead screw, as shown in FIGS. 6, and 9–12 originates from motor 92 energized by depressing push-button PB2 on control panel 28. The motor drive is transmitted via timing belt 93 to a sheave 94 secured on a rotatable shaft 95 that rotates at constant speed when motor 92 is operating. The output of shaft 95 is connected to a 4-stop Geneva mechanism 96 converting a constant drive input to a start-stop output in the ratio of 4 to 1 per revolution of the shaft. The output of the Geneva is conveyed by a rotatable shaft 97 on which spur gear 98 is secured and meshing with pinion 99 secured to an extension of lead screw 86. As motor 92 operates therefore, the welding head is caused by the carriage mechanism to move axially parallel to mandrel 31 in a start-stop cycle. Concomitantly therewith, cam 101 on the rear end of shaft 95 actuates a micro-switch MS–10 in timed relation to movement of the head to energize air solenoid SOL–1 when head movement stops actuating air cylinder 91 to effect the vertical descent and ascent of electrode 55. With each descending contact at the set firing pressure the electrode is energized to form a weld at the point of contact. In a preferred arrangement welds are made on about ¼ to ½ inch spacing until motor 92 is de-energized as the head reaches its end of travel and actuates micro switches MS–4 and MS–7 supported on frame 85. In this latter position, welding of the leading portion of the foil to the drum 15 has been completed and the apparatus responds to readiness to the next operational sequence.

Figure 3:
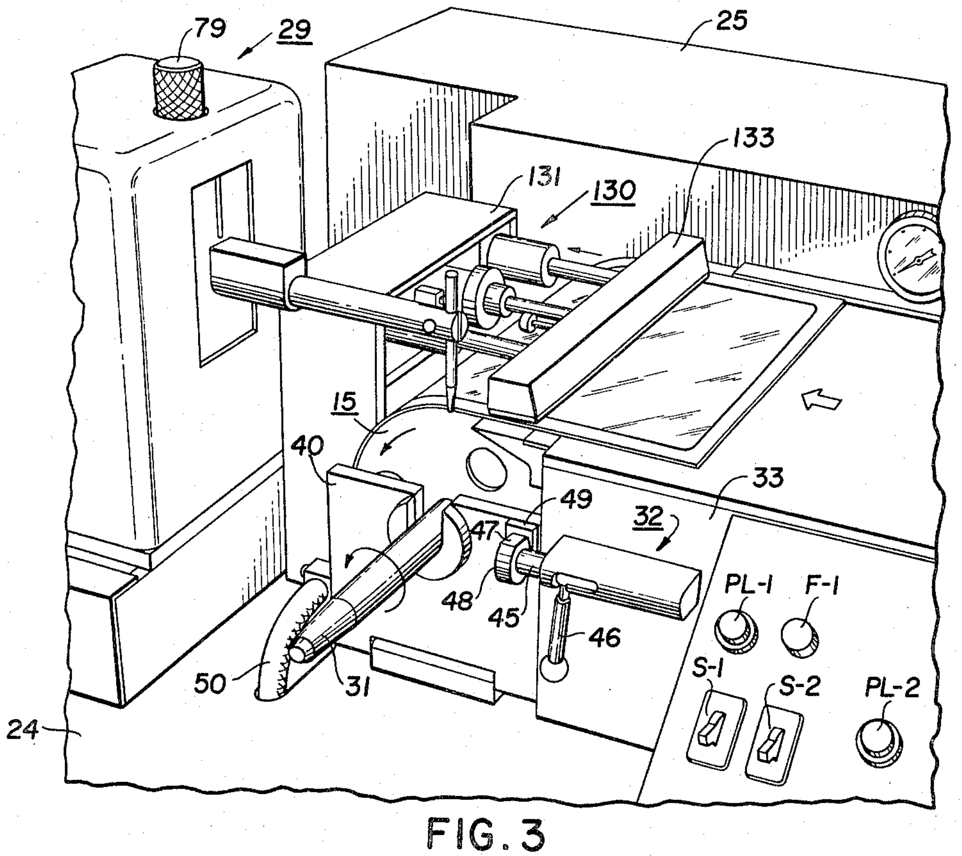
FIG. 3 is an isometric view of a portion of the apparatus of FIG. 2 during a subsequent wrap-around operational step.
Figures 6, 7, 8:
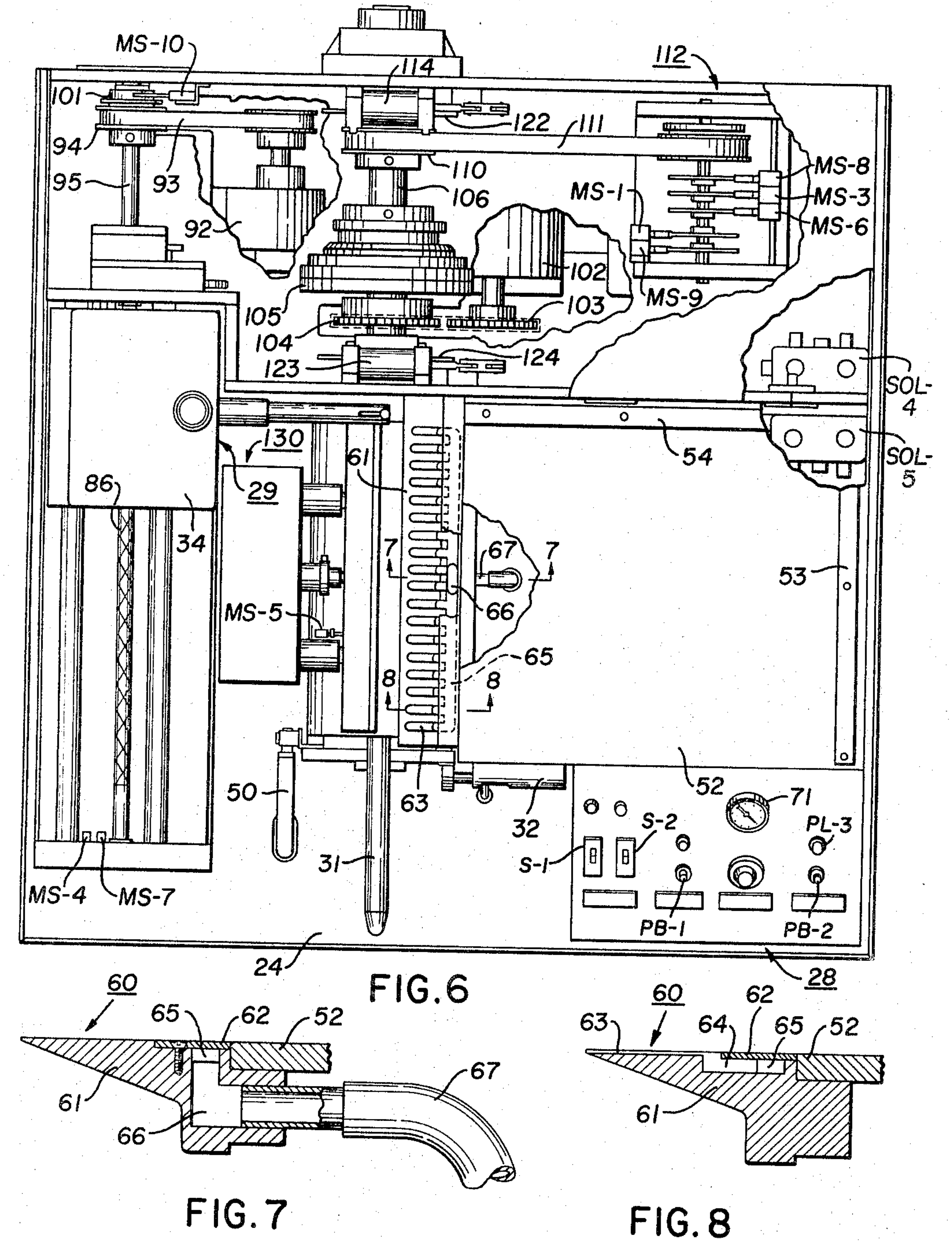
FIG. 6 is a top plan view of the apparatus of FIG. 2, partially broken away to illustrate the drive mechanisms thereof.
FIG. 7 is a sectional elevation taken substantially along lines 7—7 of FIG. 6.
FIG. 8 is a sectional elevation taken substantially along the lines 8—8 of FIG. 6.
Figure 9:
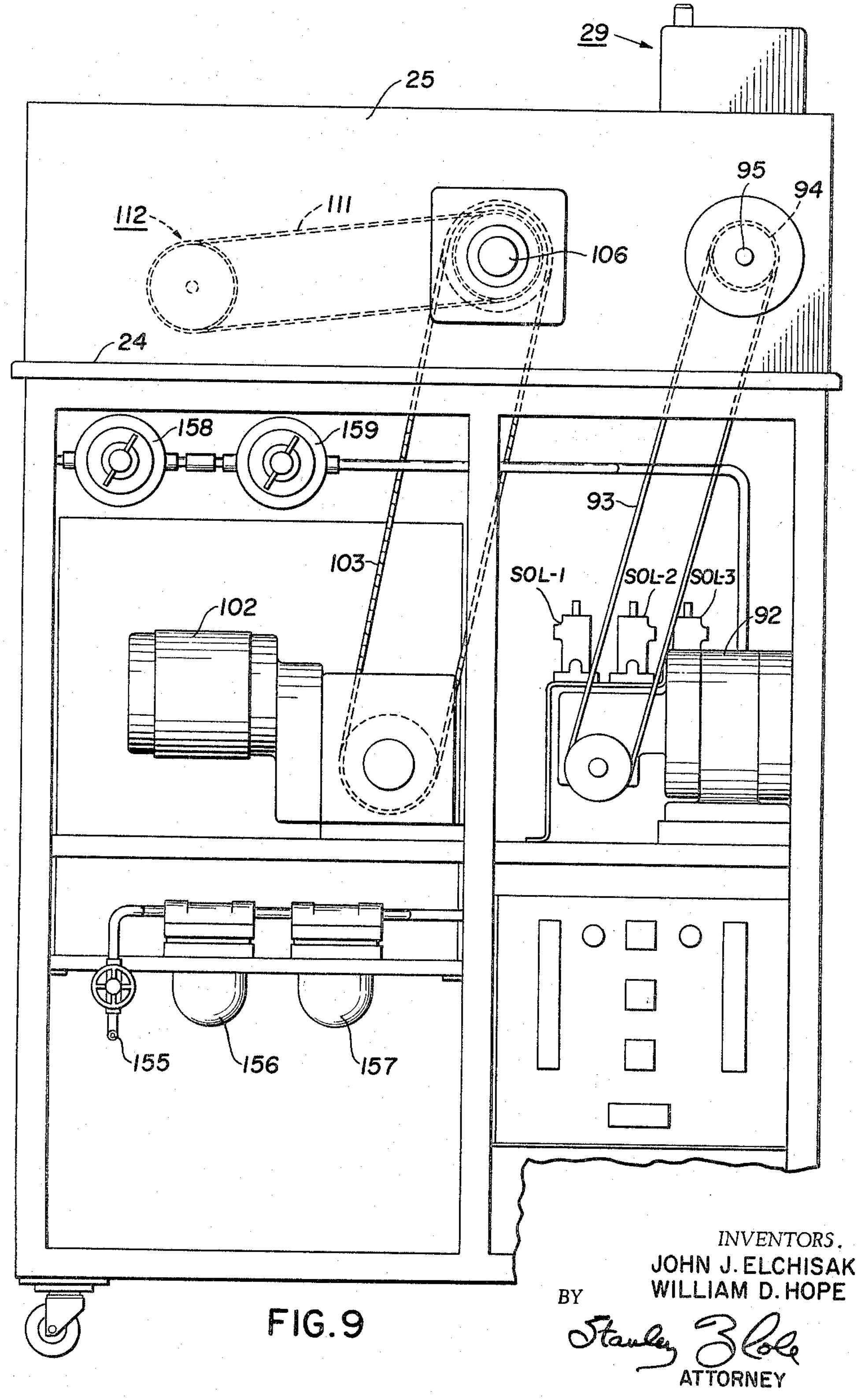
FIG. 9 is a rear elevation, of the apparatus of FIG. 2 with the cover removed.
Figures 10, 11:
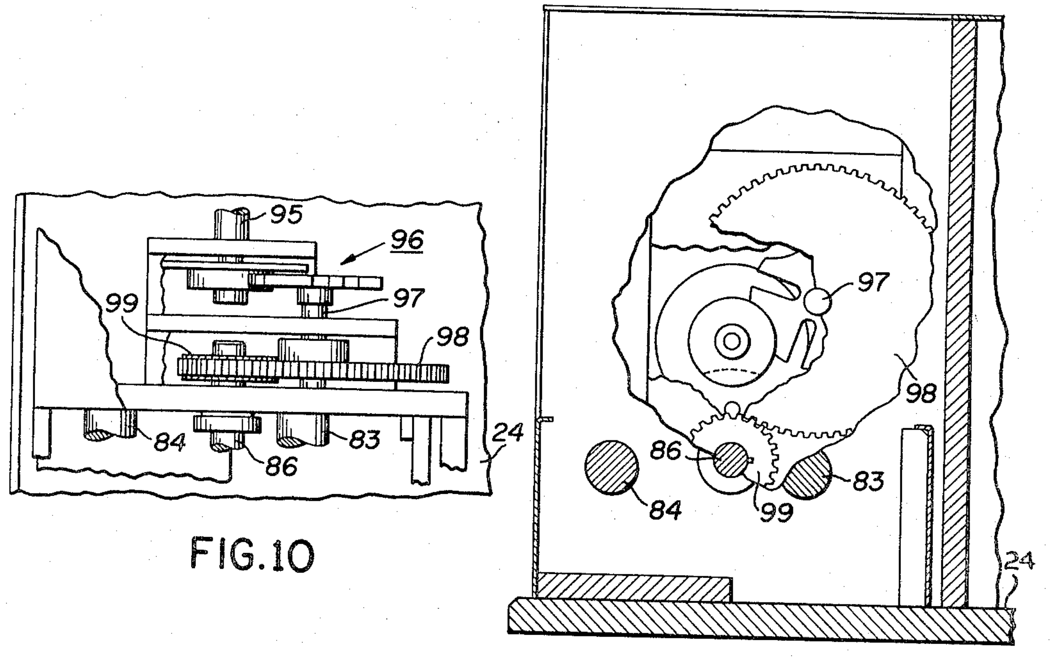
FIG. 10 is a partial plan view of the welder carriage drive.
FIG. 11 is a front elevation partially broken away of the mechanism of FIG. 10.
Figure 12:
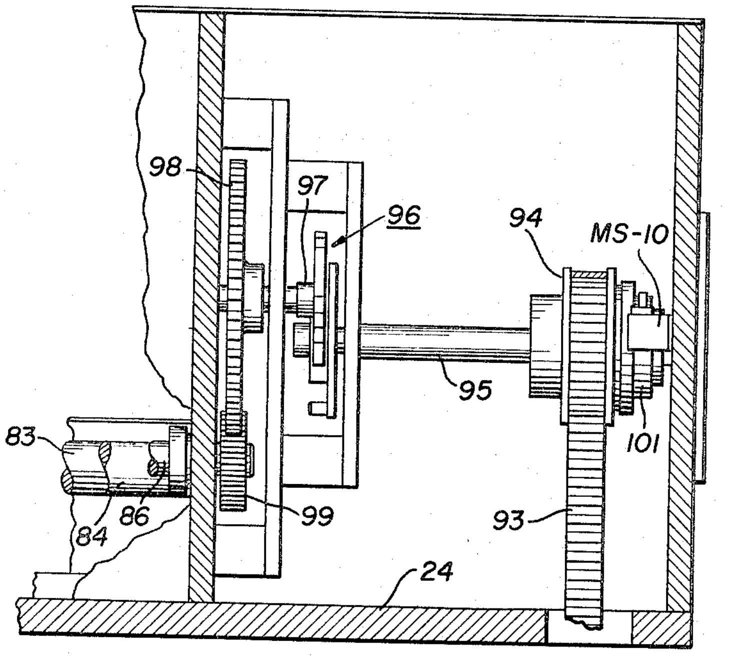
FIG. 12 is an end elevation of the mechanism of FIG. 10.
Figure 14:
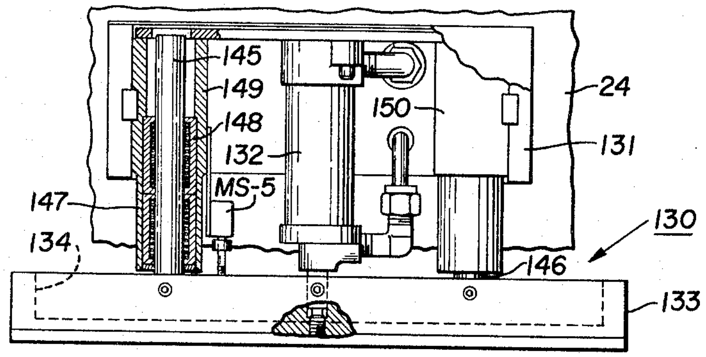
FIG. 14 is a plan view of a clamp mechanism shown in its normal non-clamping position for securing a trailing edge of a sheet in a welding position.
Figure 15:
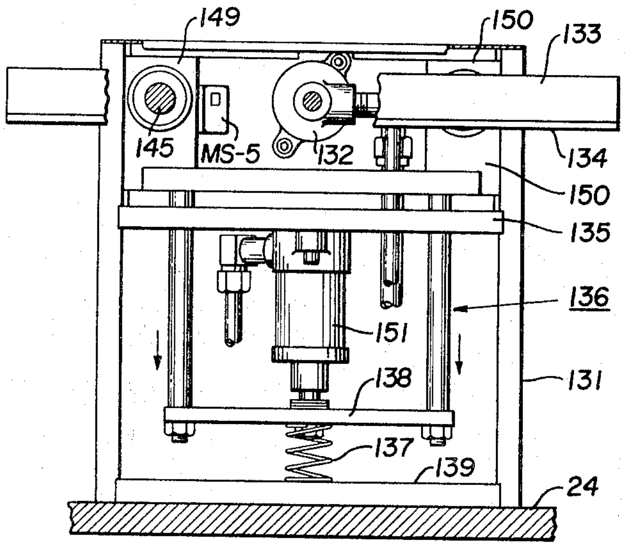
FIG. 15 is a front elevation of the clamp mechanism of FIG. 14.
Figure 16:
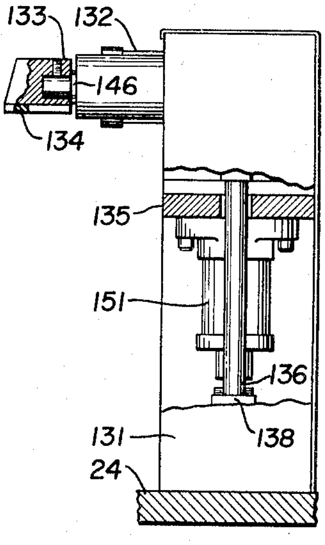
FIG. 16 is an end elevation of the clamp mechanism of FIG. 14.
Figure 18:
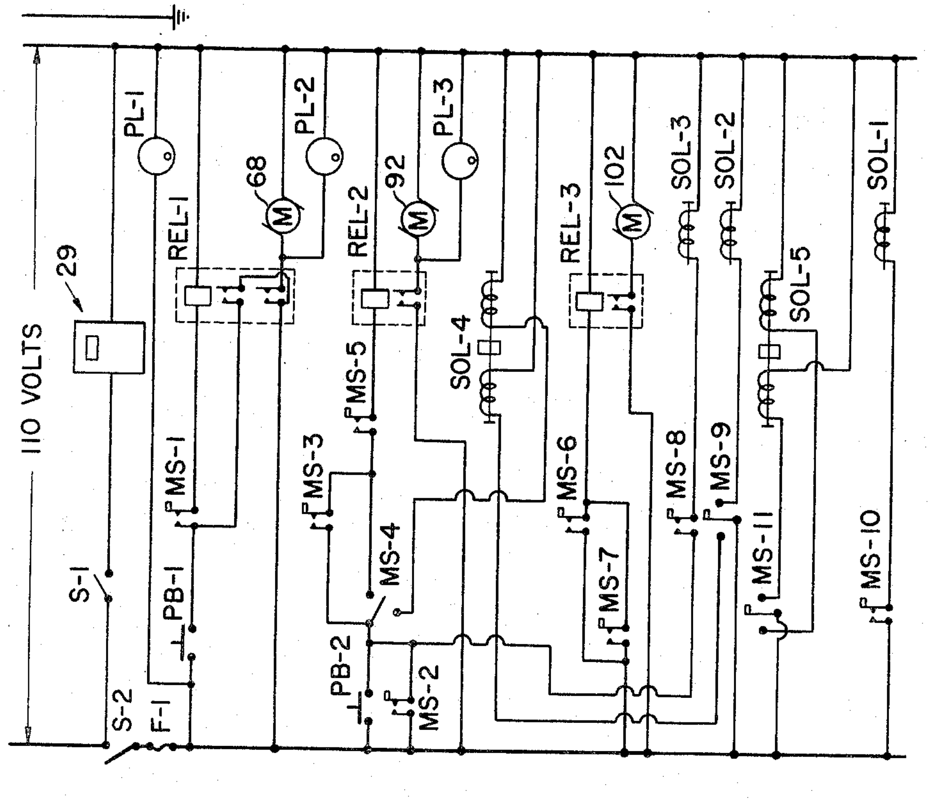
FIG. 18 is a schematic electrical diagram.
Figure 19:
FIG. 19 is a timing chart for component operation in the welding apparatus.

Foil 9 is then wrapped under a winding tension about the drum in the manner shown in FIG. 3 until the foil reaches a position relative to the electrode 55 as shown in FIG. 2(*b*) displaced 356° from the first weld position. This ensures effecting the second trailing edge weld in the non-overlapping portions of foil. Windup as shown in FIGS. 6 and 9 is effected from a constantly-driven motor 102 energized by micro-switch MS–7 actuated by the welding head in its traveled position. The drive output of the motor is transmitted via a timing chain 103 to a sprocket 104 in turn connected to the input of a slip clutch 105. When engaged, the clutch is adapted to drive a windup shaft 106 (see also in FIG. 13) that is coupled to the mandrel 31 on which the drum blank is secured and driven. Secured on the windup shaft on the side opposite the clutch is a sheave 110 driving a timing belt 111 adapted to effect operation of a programmer 112 to actuate micro-switches MS–1, –3, –6, –8, and –9 and air solenoids in their related sequence of operation as shown in FIGS. 18 and 19.

When the foil wraps through a displaced 356° angle of rotation to the relation shown in FIG. 2(*b*) micro-switch MS–9 is actuated energizing air solenoid SOL–4 to admit air pressure to air cylinder 114. Connected to the air cylinder is an arm member 115 (FIG. 13) supported to pivot about a pin 116 whereby the arm is moved when the cylinder is energized from the position shown dashed to the position shown solid. Secured extending from the arm 115 is a stop bar 120, adapted in the position shown in the figure to engage a stop plate 121 mounted on a cam stop 122 in turn secured to the windup shaft 106. This position of stop bar 120 arrests rotation of the shaft 106 at the appropriate welding position while continuous operation of motor 102 secures the shaft through action of the slip clutch urging the windup shaft in the direction arrested by the stopbar. As the drum rotates for foil wrapup, vacuum is maintained in lip 60 to create a winding tension and effect a taut wraparound of the foil to the drum. Tensive, taut wrap has been found preferred to prevent subsequent rippling or the like of the foil on the drum when employed ultimately in an automatic xerographic apparatus.

In order to maintain this tension on the foil after the trailing edge breaks vacuum on passing over the vacuum lip there is provided an air clamp unit designated 130. The air clamp as shown in FIGS. 2, 3, 14, 15 and 16 includes a vertically arranged frame support 131 supporting internally near its top an air piston 132 connected to an elongated clamping head 133. Along the underside front perimeter of the head 133 there is provided a rubber shoe 134. The normal inactive position of the head is illustrated in FIG. 2 with the head retracted inward and supported at an elevation slightly above the plane of the foil. Within the frame 131 and extending laterally across is a stationary bar 135 through which is vertically extended a yoke 136 adapted to be moved up and down through sleeves provided in the bar. The head 133 is secured to the yoke and is maintained in its uppermost normal position by action of an auxiliary spring 137 compressed between a lower cross bar 138 of the yoke and a permanent plate 139 secured to shelf 24. The clamp head is further supported on individual guide rods 145 and 146 each horizontally moveable in a pair of roller bushings 147 and 148, set respectively in blocks 149 and 150 mounted on the yoke.

The foil advances in the wrapping operation as in FIG. 3 with the trailing edge approaching vacuum lip 60. Before passing the lip air piston 132 is actuated through air solenoid SOL–2 extending clamp head 133 horizontally outward beyond the weld line to the position shown in FIG. 3. On reaching its furthermost extension, air piston 132 is de-actuated while air piston 151 secured vertically below plate 135 is actuated through solenoid SOL–3 forcing the entire yoke support via cross bar 138 down against the compression of spring 137. This latter action brings the head shoe 134 down on the foil surface applying a pressure thereagainst of approximately 20 to 30 p.s.i.g.

Continued advancement of the foil with the clamping head in this position causes the latter to be dragged rearwardly until restored to its normal unextended position behind the path of electrode 55, but still applying a mechanical pressure downward against the foil on the drum. By this means, a constant windup tension is maintained between the foil and drum blank to effect a taut wrap about the entire drum circumference while serving during the subsequent welding operation of the trailing border to hold the foil firmly against the drum as in FIG. 2(*b*). Micro-switch MS–5 provides a safety interlock to prevent subsequent operation of the welding head unless the clamping head is fully retracted.

Figure 13:
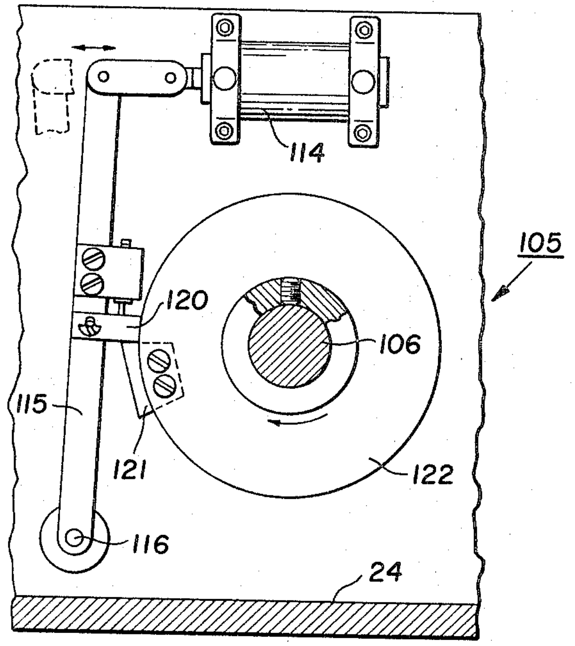
FIG. 13 is an elevation of a clutch stop mechanism associated with the wrap-around drive for wrapping a sheet into a drum blank after welding a leading sheet edge thereto.

Thereafter, the welding operation described above is repeated with the welding electrode being advanced continually start-stop in a return direction from that employed in welding the leading border of the foil. With each interruption of head movement electrode 55 effects a weld. When the welding head arrives at its furthermost position in completing the latter weld, micro-switch MS–2 is opened de-energizing the apparatus including air cylinder 151 permitting the air clamp to rise up and be restored vertically to its normal starting position. MS–2 also de-energizes solenoid SOL–4 causing air cylinder 114 to vent and release stop bar 120 (FIG. 13). This allows windup shaft 106 to rotate an additional 4° where it is positively stopped by the energizing of solenoid SOL–5 which actuates air cylinder 123 to arrest a cam plate 124 operative similar to cam plate 122 described above. Micro-switches MS–13, 6 and 8 are actuated during the final 4° of rotation and resume their original starting positions. The operation at this point is complete and fold 16 forms a tight compressive overlap onto border 12. By opening latch 32, gate 40 can be dropped and a completed xerographic drum removed.

Figure 17:
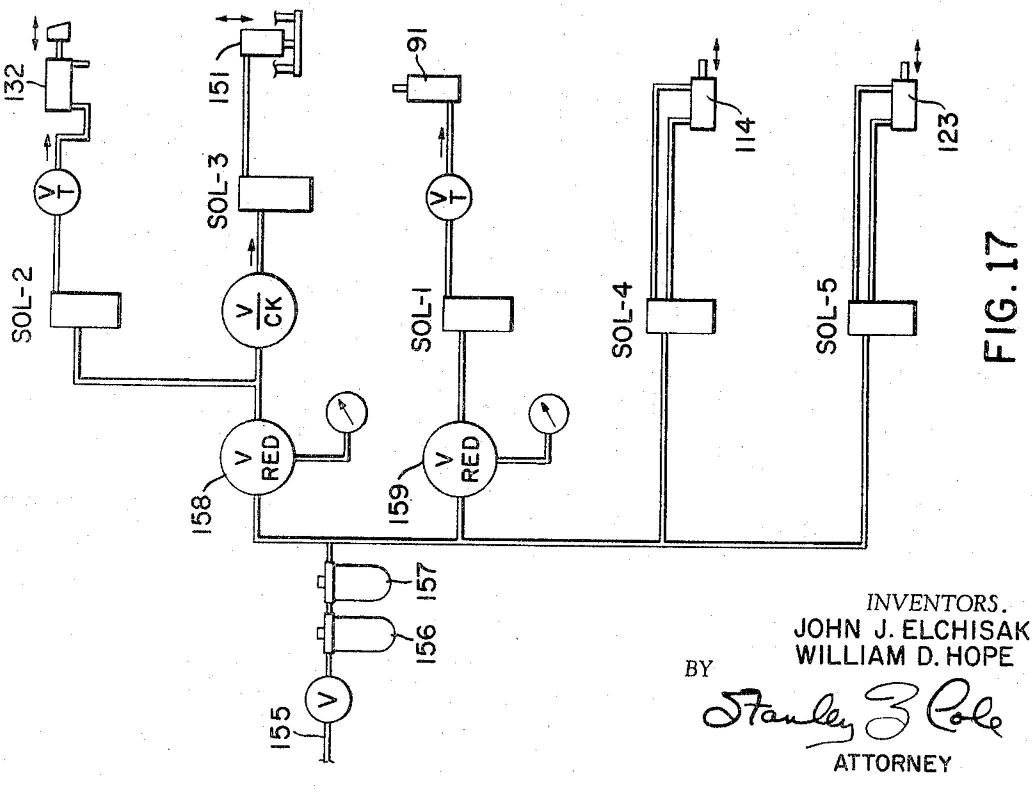
FIG. 17 is a schematic of the pneumatic connections and components for the welding apparatus.

Air pressure for the various operations is provided in the embodiment described from an external source supplied to a conduit 155 as shown in FIG. 9 and from which it passes through an air filter 156 and an air oiler 157. As can be seen by referring also to FIG. 17, air pressure of about 60 p.s.i.g. is applied to solenoids SOL–4 and SOL–5 while the remaining filtered air is divided between pressure regulator 158 and 159 which reduces the pressure to approximately 21 p.s.i.g. and 30 p.s.i.g. respectively, for discharge to their pneumatically operated components in the sequence discussed above.

The apparatus above described had been found to produce a very neat and uniform attachment of the foil to the drum blank without abrading or otherwise deleteriously affecting the relatively soft photoconductive selenium surface. The use of this apparatus is obviously limited to those materials which can be joined by means of resistance capacitor discharge welding. Typical for such use are a steel drum blank and brass foil on which a photoconductor is supported. However, other materials are known in the art which are also susceptible to welding by this technique. Likewise, other materials not readily susceptible to such welding can be adapted, as for example by zinc and copper plating of an aluminum drum to which a brass foil can be subsequently attached. Further, it is possible to employ a transition strip between the foil and the drum to accomplish a satisfactory metallurgical combination between the foil and the transition strip and the transition strip to the drum. Other variations will occur to those skilled in the art. Further, it should be apparent that the welding apparatus has utility for attaching foils other than those supporting a photoconductor to a suitable drum blank for a variety of different purposes outside the xerographic art.

Since many changes can be made in the above construction and many apparently widely different embodiments of this invention can be made without departing from the scope thereof, it is intended that all matter contained in the drawings and specification shall be interpreted as illustrative and not in a limiting sense.

What is claimed is:

1. Apparatus for attaching a conductive sheet-like member supporting a layer of photoconductive insulating material onto a cylindrical drum comprising:

(a) a rotatable mandrel on which to support a drum blank on which a sheet-like member supporting a layer of photoconductive insulating material is to be attached;

(b) sheet support means adapted to support a leading border of a sheet to be attached in substantially axially parallel contact to the periphery of a drum blank on said mandrel;

(c) a welding head movable substantially parallel to the axis of said mandrel and supporting a welding electrode adapted to make reciprocating contact with the sheet along the line of said sheet contact to the drum periphery;

(d) first drive means connected to said welding head to effect continual interrupted movement thereof;

(e) means to actuate said electrode into welding relation with the sheet with each interrupted movement of the welding head;

(f) second drive means operatively connected to the drum support means adapted after a complete welding traverse of said welding head over said leading sheet portion to effect rotation of the drum thereon whereby to draw the sheet from its support means into a wrap-around relation on the drum and place the trailing portion of the sheet into substantially axially parallel contact with the drum periphery;

(g) vacuum means operative concomitantly with said last recited means to apply a winding tension to the sheet during a substantial part of said windup;

(h) clamping means adapted to apply winding tension to the sheet at least when not applied by said vacuum means during the remainder of said windup; and (i) first drive actuator means to traverse said welding head for welding both the leading and trailing sheet portions to the drum.

2. Apparatus in accordance with claim 1 including means urging drum windup to assist in maintaining windup tension during welding of the trailing sheet portion.

3. Apparatus in accordance with claim 1 including means adapted to effect a predetermined angular displacement about the drum blank between the leading and trailing welds.

4. Apparatus for attaching a sheet-like member onto a cylindrical drum comprising:

(a) rotatable support means on which to support a drum blank on which a sheet-like member is to be attached;

(b) sheet suppport means adapted to support a leading portion of a sheet to be attached in substantially axially parallel contact to the periphery of a drum blank on its support means;

(c) bonding means operative to bond at least part of the contacting portion of the sheet to the drum periphery;

(d) drive means operatively connected to the drum support means adapted after bonding of a leading portion by said bonding means to effect rotation of a drum thereon whereby to draw a sheet from its support means into a wrap-around relation on the drum and place the trailing portion of the sheet into substantially axially parallel contact with the drum periphery;

(e) means operative concomitantly with said last recited means to apply a predetermined winding tension to the sheet to effect a taut drum wrap;

(f) means to actuate said bonding means when the sheet portions are in contacting relation to the drum periphery to attach the sheet securely to the drum; and, (g) pressure applicator means adapted to urge the sheet-like member against the drum blank while bonding the respective sheet portion thereto, said pressure applicator means including vacuum means operable while bonding a leading portion and mechanical clamping means operable while bonding a trailing portion.

5. Apparatus for wrapping a sheet-like member about a drum blank and for bonding said sheet-like member longitudinally along the drum surface at a work zone including:

(a) a mandrel adapted to support a drum blank with the surface of said drum blank in said work zone;

(b) bonding means positioned to secure said sheet-like member to said drum surface in said work zone;

(c) means to rotate said mandrel to wrap said sheet-like member about said drum surface;

(d) a vacuum plate positioned adjacent to said work zone to be in contact with a surface of said sheet-like member to restrain movement of said sheet-like member as it is wrapped about said drum surface; and, (e) a pressure clamp movable into said work zone and against said sheet-like member to press said sheet-like member against said drum surface for bonding thereto, the movement of said pressure clamp being coordinated with the rotation of said drum blank to secure the end of said sheet-like member against the surface of said drum blank when said sheet-like member leaves said vacuum plate.

6. Apparatus for bonding a sheet-like member onto the surface of a drum blank comprising:

(a) a rotatable mandrel for supporting a drum blank along its axis and placing a portion of said drum blank surface coextensive with said axis in a work zone;

(b) a support platform adjacent said work zone for supporting a sheet-like member with the surface portion associated with one edge of said sheet-like member in contact with the surface of said drum blank in said work zone;

(c) a bonding apparatus which is movable in a path substantially parallel to and coextensive with said work zone for effecting selective bonds between said sheet-like member and said drum blank surface in contact at said work zone;

(d) drive means coupled to said mandrel for moving successive portions of the surface of said supported drum blank into said work zone;

(e) vacuum means intermediate said support platform and said work zone for restraining movement of said sheet-like member across said vacuum means; and, (f) pressure clamp means movable into said work zone for urging said sheet-like member against said drum blank surface in said work zone when said sheet-like member leaves the restrain of said vacuum means.

7. An apparatus for bonding a sheet-like member onto the surface of a drum blank comprising:

(a) a rotatable mandrel for supporting a drum blank along its axis and placing in a work zone a portion of said drum blank surface coextensive with said axis;

(b) a support platform adjacent said work zone for supporting a sheet-like member with a surface portion associated with one edge of said sheet-like member in contact with the surface of said drum blank in said work zone;

(c) a bonding means movable in a path substantially parallel to and coextensive with said work zone for effecting selective bonds between said sheet-like member and said drum blank surface in contact at said work zone;

(d) drive means coupled to said mandrel for moving successive portions of the surface of said supported drum blank into said work zone;

(e) vacuum means adjacent said work zone for restraining movement of said sheet-like member across said vacuum means from said support platform to said work zone; and, (f) pressure clamp means movable into said work zone for urging said sheet-like member against said drum blank surface in said work zone when said sheet-like member leaves the restraint of said vacuum means.

8. In an apparatus for wrapping a sheet-like member about the surface of a drum blank and for bonding the sheet-like member longitudinally along the drum surface at a work zone wherein a mandrel supports the drum blank for movement of the drum surface through the work zone to permit bonding means to secure the sheet-like member to the drum surface in the work zone, and wherein drive means rotates said mandrel to wrap the sheet-like member about the drum surface, the combination including:

(a) vacuum plate means positioned adjacent said work zone to be in contact with a surface of said sheet-like member to restrain movement of said sheet-like member as it is wrapped about said drum surface; and, (b) pressure clamp means movable into said work zone and against said sheet-like member to urge said sheet-like member against said drum surface for bonding thereto, the movement of said pressure clamp means being coordinated with the rotation of said drum blank to secure the end of said sheet-like member against said drum surface when said sheet-like member leaves said vacuum plate means.

References Cited

UNITED STATES PATENTS

| | | | |
|---|---|---|---|
| 1,942,304 | 1/1934 | Mylting | 219—76 |
| 2,298,250 | 10/1942 | Brown | 219—107 |
| 2,479,556 | 8/1949 | Chanowitz | 219—78 |
| 3,047,712 | 7/1962 | Morris | 219—107 |

RICHARD M. WOOD, *Primary Examiner.*

B. A. STEIN, *Assistant Examiner.*

UNITED STATES PATENT OFFICE

Certificate of Correction

Patent No. 3,341,681 Patented September 12, 1967

John J. Elchisak and William D. Hope

Application having been made by John J. Elchisak and William D. Hope, the inventors named in the patent above identified; Xerox Corporation, Rochester, New York, a corporation of New York, the assignee; and Edward M. Van Wagner of Webster, New York, for the issuance of a certificate under the provisions of Title 35, Section 256 of the United States Code, adding the name of the said Edward M. Van Wagner as a joint inventor, and a showing and proof of facts satisfying the requirements of the said section having been submitted, it is this 9th day of July 1968, certified that the name of the said Edward M. Van Wagner is hereby added to the said patent as a joint inventor with the said John J. Elchisak and William D. Hope.

[SEAL]

EDWIN L. REYNOLDS,
*First Assistant Commissioner of Patents.*